(12) United States Patent
Gunal

(10) Patent No.: US 8,220,332 B1
(45) Date of Patent: Jul. 17, 2012

(54) CONDUIT TONER AND DETECTOR

(76) Inventor: Erkan Gunal, Centennial, CO (US)

( * ) Notice: Subject to any disclaimer, the term of this patent is extended or adjusted under 35 U.S.C. 154(b) by 468 days.

(21) Appl. No.: 12/563,114

(22) Filed: Sep. 19, 2009

(51) Int. Cl.
*G01H 1/00* (2006.01)
(52) U.S. Cl. .................... 73/587; 73/596; 73/632
(58) Field of Classification Search ............ 73/587
See application file for complete search history.

(56) References Cited

U.S. PATENT DOCUMENTS

| | | | |
|---|---|---|---|
| 4,233,561 A | 11/1980 | Haddon et al. | |
| 4,234,942 A | 11/1980 | Prause et al. | |
| 4,494,224 A | 1/1985 | Morrell et al. | |
| 4,584,676 A * | 4/1986 | Newman | 367/108 |
| 4,934,478 A | 6/1990 | Melocik et al. | |
| 5,553,498 A * | 9/1996 | Zelczer et al. | 73/584 |
| 6,268,731 B1 | 7/2001 | Hopwood et al. | |
| 6,772,634 B2 | 8/2004 | Ibey | |

\* cited by examiner

*Primary Examiner* — Hezron E Williams
*Assistant Examiner* — Gregory J Redmann

(57) ABSTRACT

A conduit toner and detector to identify an unknown conduit route or direction in combination with a pull box or junction box from one end to another end using a sound generator and a sound detector, comprising: an enclosure and a sound generator for generating a detectible sound pressure; an electrical power source powering the sound generator through a power button; the sound generator operates in a detectable sound range, thus a sound detector is used to notify the presence of sound waves inside the conduit that is being tested with or without existing cables in place. Other embodiments are described and shown.

12 Claims, 5 Drawing Sheets

Figure 1:
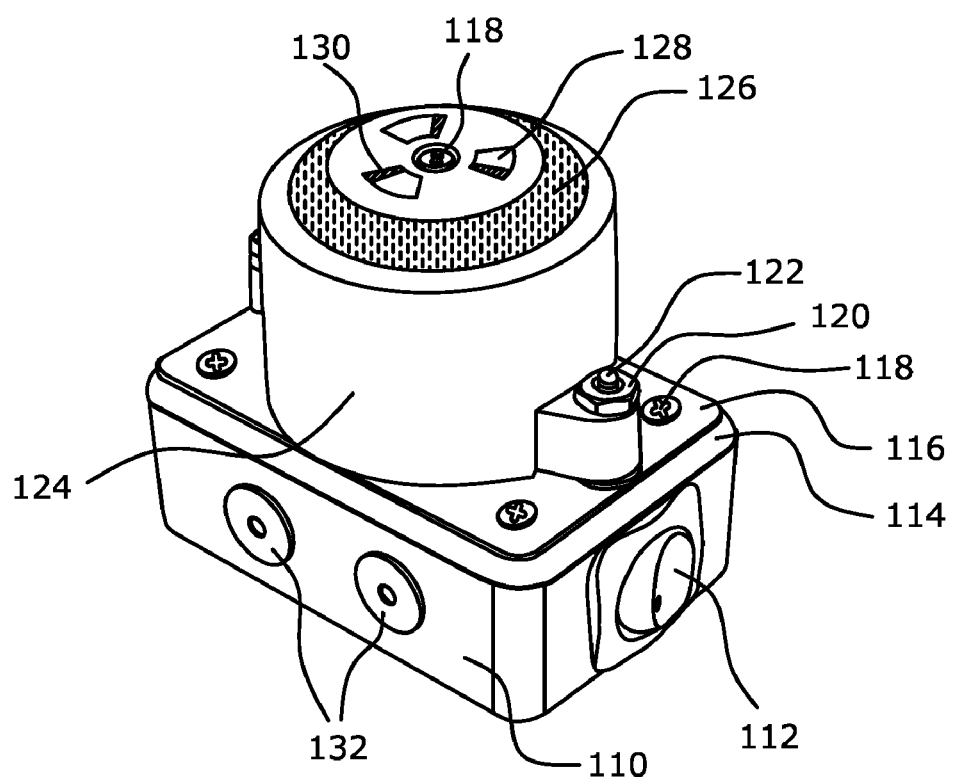

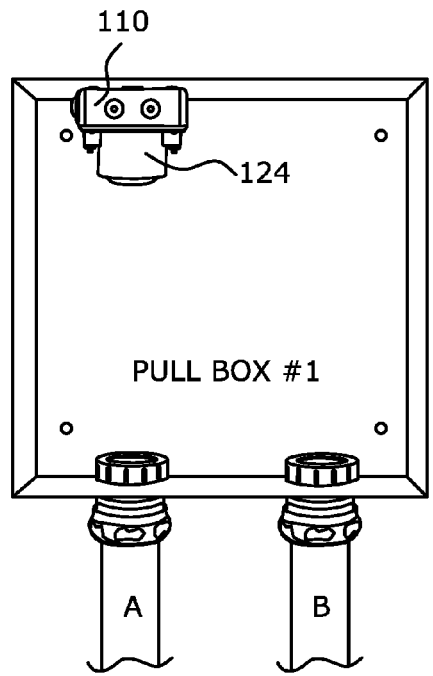
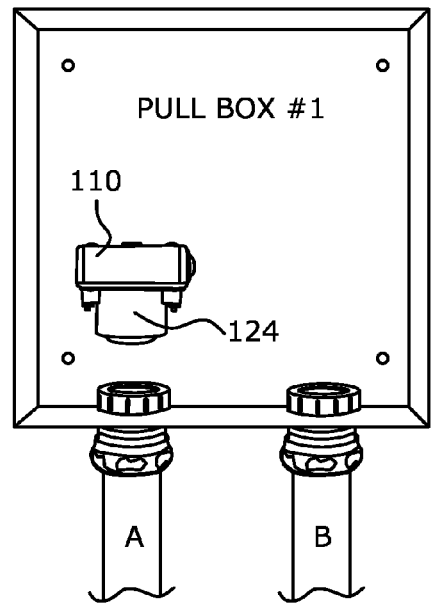
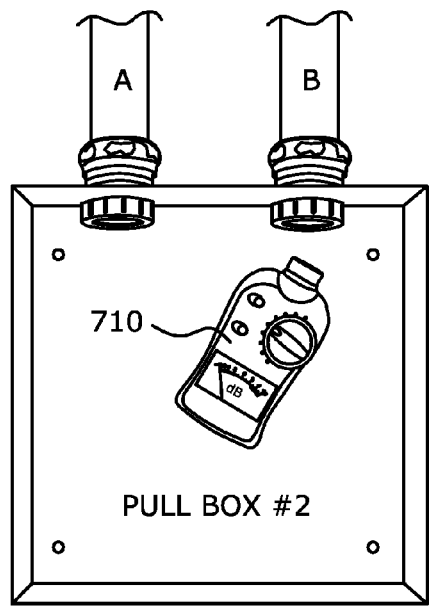
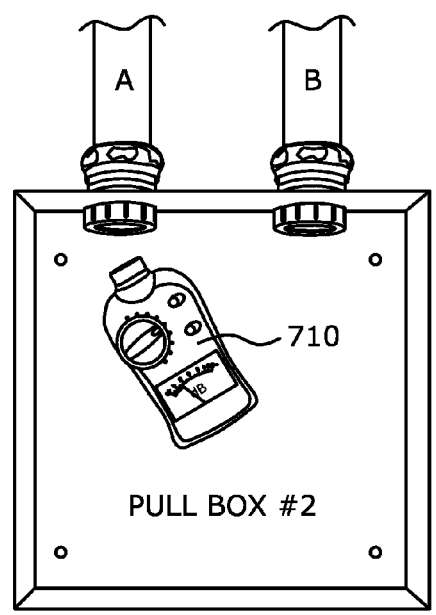
FIG. 7a    FIG. 7b

CONDUIT TONER AND DETECTOR

BACKGROUND

1. Field

This application relates to tracing, identifying, detecting, and surveying of indoor/outdoor rated conduits, ducts and pipes occupied in underground plants or building infrastructures. Specifically, this application introduces an end-to-end directional route identifier for both metallic and non-metallic conduit and piping infrastructures.

2. Prior Art

Typical electrical conduits found in building construction and infrastructures are described as follows:

(a) Electrical Conduit:

Conduit systems are classified by their wall thickness, mechanical stiffness, and material used to make the tubing. An electrical conduit is a purpose-designed electrical piping system used for protection and routing of electrical wiring. Electrical conduit may be made of metal, plastic, fiber or fired clay. Flexible conduit is available for special purposes. Conduit is generally installed by electricians at the site of installation of electrical equipment. Its use, form, and installation details are often specified by wiring regulations, such as the U.S. NEC (National Electrical Code®) or other local or international authorities. The term "conduit" is commonly used by electricians to describe any system that contains electrical conductors, but the term has a more restrictive definition when used in wiring regulations.

Early electric lighting installations made use of existing gas pipe to gas light fixtures (converted to electric lamps). Since this technique provided very good protection for interior wiring, it was extended to all types of interior wiring and by the early 20th century purpose-built couplings and fittings were manufactured for electrical use.

Electrical conduits provide very good protection to enclosed conductors from impact, moisture, and chemical vapors. Varying numbers, sizes, and types of conductors can be pulled into a conduit, which simplifies design and construction compared to multiple runs of cables or the expense of customized composite cable. Wiring systems in buildings are subject to frequent alterations. Frequent wiring changes are made simpler and safer through the use of electrical conduit, as existing conductors can be withdrawn and new conductors installed, with little disruption along the path of the conduit. A conduit system can be made waterproof or submersible. Metal conduit can be used to shield sensitive circuits from electromagnetic interference, and also can prevent emission of such interference from enclosed power cables. When installed with proper sealing fittings, a conduit will not permit the flow of flammable gases and vapors, which provides protection from fire and explosion hazard in areas handling volatile substances.

Some types of conduit are approved for direct encasement in concrete. This is commonly used in commercial buildings to allow electrical and communication outlets to be installed in the middle of large open areas. For example, retail display cases and open-office areas use floor-mounted conduit boxes to connect power and communications cables. Both metal and plastic conduit can be bent at the job site to allow a neat installation without excessive numbers of manufactured fittings. This is particularly advantageous when following irregular or curved building profiles.

The cost of conduit installation is higher than other wiring methods due to the cost of materials and labor. In applications such as residential construction, the high degree of physical damage protection is not required so the expense of conduit is not warranted. Conductors installed within conduits cannot dissipate heat as readily as those installed in open wiring, so the current capacity of each conductor must be reduced if many are installed in one conduit.

It is impractical, and prohibited by wiring regulations, to have more than 360 degrees of total bends in a run of conduit, so special outlet fittings must be provided to allow conductors to be installed without damage in such runs. While metal conduits can be used as a grounding conductor, the circuit length is limited. For example, a long run of conduit as grounding conductor will not allow proper operation of overcurrent devices on a fault.

(b) Rigid Metallic Conduit (RMC):

Rigid metallic conduit is a thick threaded tubing, usually made of coated steel, stainless steel or aluminum.

(c) Rigid Nonmetallic Conduit (RNC):

Rigid nonmetallic conduit is a non-metallic unthreaded tubing.

(d) Galvanized Rigid Conduit (GRC):

Galvanized rigid conduit is a galvanized steel tubing, with a tubing wall that is thick enough to allow it to be threaded. Its common applications are in commercial and industrial construction. It's also preferred in exterior installations.

(e) Electrical Metallic Tubing (EMT):

Electrical metallic tubing, sometimes called thin-wall, is commonly used indoors instead of galvanized rigid conduit (GRC), as it is less costly and lighter than GRC. EMT cannot be threaded. Lengths of conduit are connected to each other and to equipment with clamp-type fittings. Like GRC, EMT is more common in commercial and industrial buildings than in residential applications. EMT is generally made of coated steel, though it may be aluminum.

(f) Electrical Nonmetallic Tubing (ENT):

Electrical nonmetallic tubing is a thin-walled corrugated tubing that is moisture-resistant and flame retardant. It is pliable such that it can be bent by hand and is often flexible although the fittings are not. It is not threaded due to its corrugated shape although the fittings might be.

(g) Flexible Metallic Conduit (FMC):

Flexible metallic conduit is made through the coiling of a self-interlocked ribbed strip of aluminum or steel, forming a hollow tube through which wires can be pulled. FMC is used primarily in dry areas (e.g. underground parking facilities) where it would be impractical to install EMT or other non-flexible conduit, yet where metallic strength to protect conductors is still required. The flexible tubing does not maintain any permanent bend. Cutting FMC requires a specialized hand tool with a rotary abrasive disc to create a small incision into the ribbing so that a twisting motion separates the segments. The disc cuts deep enough to sever the armor coil but not so deep that it could damage the inside conductors. Short segments of FMC, called whips, are often used as circuit "pigtails" between fixtures and a junction box, especially in suspended ceilings. Whip assemblies save a great deal of repetitive labor when installations require several pigtails for several fixtures.

Flexible metallic conduit is coated with a UV-resistant polymer which is liquid-tight when installed with appropriate glandular fittings containing liquid-tight features such as O-rings. Wiring regulations may vary. Flexible metallic conduit may serve as an equipment-grounding conductor. Other areas may require a bonding wire for equipment grounding. The bonding wire in direct contact with the interior of the conduit creates a lower resistance grounding conductor than the conduit alone.

(h) Liquid-tight Flexible Metallic Conduit (LFMC):

Liquid-tight flexible metallic conduit is a non-metallic and liquid tight jacket covering a flexible metal interior. The interior is similar to FMC. Originally designed and manufactured by Kopex International Ltd.

(i) Liquidtight Flexible Nonmetallic Conduit (LFNC):

Liquid-tight flexible nonmetallic conduit refers to several types of flame-resistant non-metallic tubing. Interior surfaces may be smooth or corrugated. There may or may not be integral reinforcement within the conduit wall. It is also known as FNMC (Flexible Nonmetallic Conduit).

(j) Aluminum Conduit:

Aluminum conduit, similar to galvanized steel conduit, is a rigid conduit, generally used in commercial and industrial applications, where a higher resistance to corrosion is needed. Such locations would include food processing plants, where large amounts of water and cleaning chemicals would make galvanized conduit unsuitable. Aluminum cannot be directly embedded in concrete, since the metal reacts with the alkalis in cement. The conduit may be coated to prevent corrosion by incidental contact with concrete. The extra cost of aluminum is somewhat offset by the lower labor cost to install, since a length of aluminum conduit will have about one-third the weight of an equally-sized rigid steel conduit.

(k) Intermediate Metallic Conduit (IMC):

Intermediate metallic conduit is a steel tubing heavier than EMT, but lighter than RMC. It may be threaded.

(l) PVC Conduit:

PVC conduit is the lightest in weight compared to other conduit materials, and usually lower in cost than other forms of conduit. In North American electrical practice, it is available in three different wall thicknesses; with the thin-wall variety only suitable for embedded use in concrete, and heavier grades suitable for direct burial and exposed work. The various fittings made for metal conduit are also made for PVC. The plastic material resists moisture and many corrosive substances, but since the tubing is non-conductive an extra bonding (grounding) conductor must be pulled into each conduit. PVC conduit may be heated and bent in the field. Joints to fittings are made with slip-on solvent-welded connections, which set up rapidly after assembly and attain full strength in about one day. Since slip-fit sections do not need to be rotated during assembly, the special union fittings used with threaded conduit are not required. Since PVC conduits have a higher thermal coefficient of expansion than other types, it must be mounted so as to allow for expansion and contraction of each run. Care should be taken when installing PVC underground in multiple or parallel run configurations due to mutual heating effect of the installed cables.

In extreme corrosion environments where the plastic coating of the tubing is insufficient, conduits may be made from stainless steel, bronze or brass.

(m) Underground Conduit:

Large diameter (more than two inches) conduit may be installed underground between buildings to allow installation of power and communication cables. An assembly of these conduits, often called a duct bank, may either be directly buried in earth or encased in concrete. A duct bank will allow replacement of damaged cables between buildings or additional power and communications circuits to be added, without the expense of excavation of a trench. While metal conduit is occasionally used for burial, usually PVC, polyethylene or polystyrene plastics are now used due to lower cost. Formerly, compressed asbestos fiber mixed with cement was used for some underground installations. Telephone and communications circuits were installed in fired-clay conduit.

Followed by detailed conduit descriptions above, some traditionally used methods and techniques to identify, track and survey new and existing conduit runs are categorized as follows:

(a) Electromagnetic underground object detectors
(b) Ultrasonic conduit detectors
(c) Electrical current-based tracers and detectors
(d) Use of a fish tape
(e) Use of a pulling string
(f) Use of a vacuum machine and air blower
(g) Shaking the existing cables or wires inside a conduit
(h) Shouting toward a conduit opening
(i) Knocking on a conduit with a hard object Below is a brief description and problems associated with each category:

(a) Electromagnetic Underground Object Detectors:

In basic terms, a metal detector is used to locate hidden metallic objects. In technical definition, an electromagnetic inductive coil or directional antenna is positioned to detect metallic objects that are buried underground or behind a wall. These objects must be electrically conductive materials, such as metallic conduits, ducts, pipes, cables, and wires. Issued U.S. Pat. No. 6,268,731 (2001) is a good example for such application. However, this method is useless for detecting a non-metallic object, e.g. an empty plastic duct or PVC conduit filled with a non-conductive optical fiber cable. Moreover, performing an end-to-end directional route identification of an existing conduit run is impossible.

(b) Ultrasonic Conduit Detectors:

Ultrasonic sensors (also known as transceivers, when they both send and receive) work on a principle similar to radar or sonar which evaluate attributes of a target by interpreting the echoes from radio or sound waves respectively. Ultrasonic sensors generate high frequency sound waves and evaluate the echo which is received back by the sensor. Sensors calculate the time interval between sending the signal and receiving the echo to determine the distance to an object. In regards to end-to-end conduit route identification, this method is also impractical, since the near and opposite ends of a conduit run can be located anywhere (e.g., between two maintenance holes or between different floors of a multi-dwelling building), or the opposite end of the conduit may be intentionally or unintentionally blocked.

(c) Electrical Current-Based Tracers and Detectors:

This category includes hand-held devices that are used by technicians to trace and identify metallic conduit runs. However, two major problems make this technique impractical. Electrical current-based tracers and detectors cannot identify non-metallic conduit runs. Moreover, electrically conductive conduits cannot be accurately identified, since many national and local authorities require grounding and bonding on all metallic surfaces. Therefore, separate metallic conduits can be electrically connected with each other. In this case, electrical current-based tracers and detectors become useless and fail to identify intended conduit runs accurately.

(d) Use of a Fish-Tape:

This is one of the commonly preferred practices by field technicians. A fish tape (also known as a draw wire or draw tape) is a tool used by electricians to route new wiring through walls and electrical conduit. Made of a narrow band of spring steel, by careful manipulation, the tape can be "fished" or guided through the confined spaces within wall cavities. Once guided through, the new wiring can be pulled into the wall by attaching it to the end of the fish tape and pulling the tape back whence it came.

Fish tapes are usually stored coiled on a plastic reel. Because of this, they have a natural curvature and it is this curvature that allows them to be guided. By manipulating the reel, the end of the tape can be directed slightly. The tape is rigid enough that it can then be pushed in the direction in which it is pointing. In this way it can be easily guided through an empty wall cavity. Thermal insulation, firestops, pipes, HVAC (Heating, Ventilation and Air-conditioning) ducts, electrical conduits, and other obstructions make the use of a fish tape more challenging.

The "tape" can be made from many different materials including steel, fiberglass, and nylon. The tape usually has a special end ranging from a hook or loop to a specialized fastener device to allow the user to attach the tape to the cable before pulling.

Occasionally, two fish tapes are used from opposite ends of the wall. Because they each have a hooked end, one fish tape is capable of catching the other, and then the other can be pulled back, carrying the second tape out with it. Electricians sometimes attach a battery and a doorbell or buzzer to their two fish tapes so that when the ends of the two tapes make contact within the wall, the bell rings.

Use of a fish tape is also a common tool to identify conduit runs. However, if there is an existing wiring inside the conduit (e.g. high voltage wires), use of a fish tape can be risky and unsafe. Furthermore, a fish tape can potentially damage the wires inside a conduit (e.g. fragile fiber optic cables).

(e) Use of a Pulling String:

Pulling string (also known as a liner) is usually used to pull a wire or a cable bundle into a conduit. If an existing conduit already includes a pull sting installed, a technician can hold or observe the opposite end of the string, while another technician pulls the string. If the string moves, then the correct conduit is identified. This is a double work action, since it takes additional time to run the pulling string into the conduit first.

(f) Use of a Vacuum Machine and Air Blower:

A vacuum machine is commonly used by field technicians to identify unknown conduit runs. At one end of the conduit, the inside air is vacuumed while the opposite end is verified by hand for suction effect. It is also practical to feed a pulling string or rope during this process. Opposite end of the pulling string should have a knot or a small object tied to improve the movement and pulling speed inside the conduit. When the pulling string reaches the other end of the conduit, the identification is successfully completed.

An air blower is also used to push the air inside a conduit toward the opposite end. Similarly, the blowing air is confirmed by hand at the other end.

Both techniques require energy to operate the machines. Sometimes it is difficult to supply a power source (e.g. power outlet or extension cord) next to the conduit being tested. Furthermore, if the conduit is occupied with existing wires or cables, it becomes a challenge to feed a pulling string. It is also impractical to work in attics and crawl spaces where access is limited to large and heavy equipment.

(g) Shaking the Existing Cables or Wires Inside a Conduit:

Shaking the existing cables or wires inside a conduit is another common practice in the field to identify unknown conduit routes. One technician shakes the cables inside the conduit run, while another technician observes any movement at the opposite end. If the cables being pulled are fragile (e.g. fiber optic cable, twisted copper pair), high tension can cause potential damage to the fiber strands or twisted pairs inside the cable jacket if pulled improperly. Even though this method is very popular, from a safety perspective, it is not recommended.

(h) Shouting Toward a Conduit Opening:

If there are no handy tools accessible in the field to identify an unknown conduit run, a technician may shout into a conduit opening or a pull box, while another technician listens to the incoming sound at the opposite end to confirm the direction of the route being tested. However, if there are more conduits that run in the same direction, such as inside a maintenance hole (MH), it could be very difficult to listen to each conduit end individually. Meanwhile, acoustic sound waves can travel significantly long distances when guided.

(i) Knocking on a Conduit with a Hard Object:

Another common field technique is knocking on a conduit repeatedly with a hard object, such as a hammer, screw driver, etc., while another technician listens to the knocking sound to confirm the correct conduit run. This is also impractical when other conduits travel in the same direction. Moreover, a potential damage or a personal injury can occur while hitting the conduit with a hard object.

As it can be clearly seen from all said limitations of the prior arts, there has not been a better solution offered to provide a practical and efficient technique to identify end-to-end conduit directions. These and other advantages of one or more aspects will become apparent from a consideration of the ensuing description and accompanying drawings of the present application.

SUMMARY

In accordance with one embodiment, this application provides a more efficient, safer and practical technique to identify unknown conduit or pipe directions from one end to another using a mobile acoustic sound generator. At the opposite end, a mobile sound detector is used to identify the correct conduit or pipe direction that is being tested. The operating frequency and the volume of the sound generator are in a detectable range for the sound detector.

DRAWINGS-FIGURES

Figure 2:
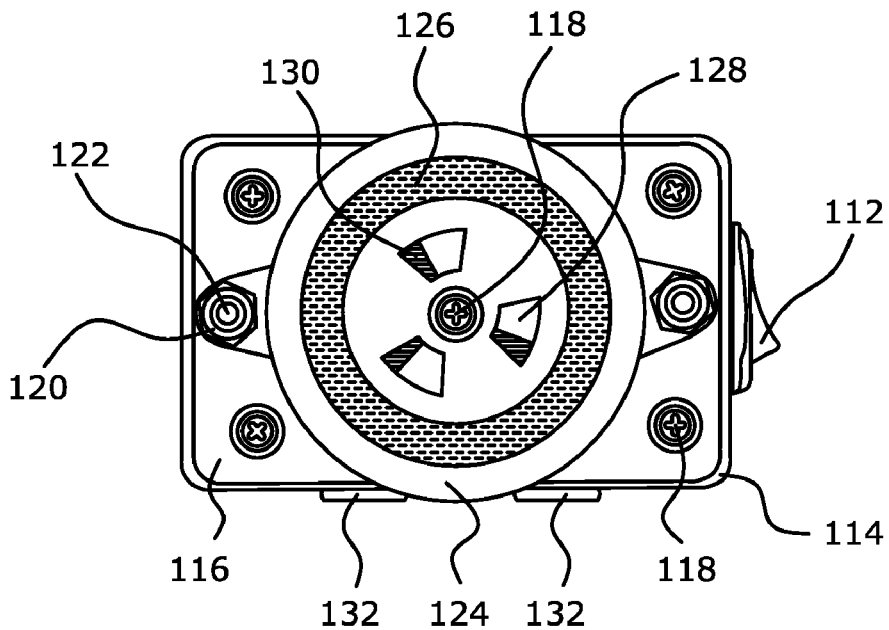
Figure 3:
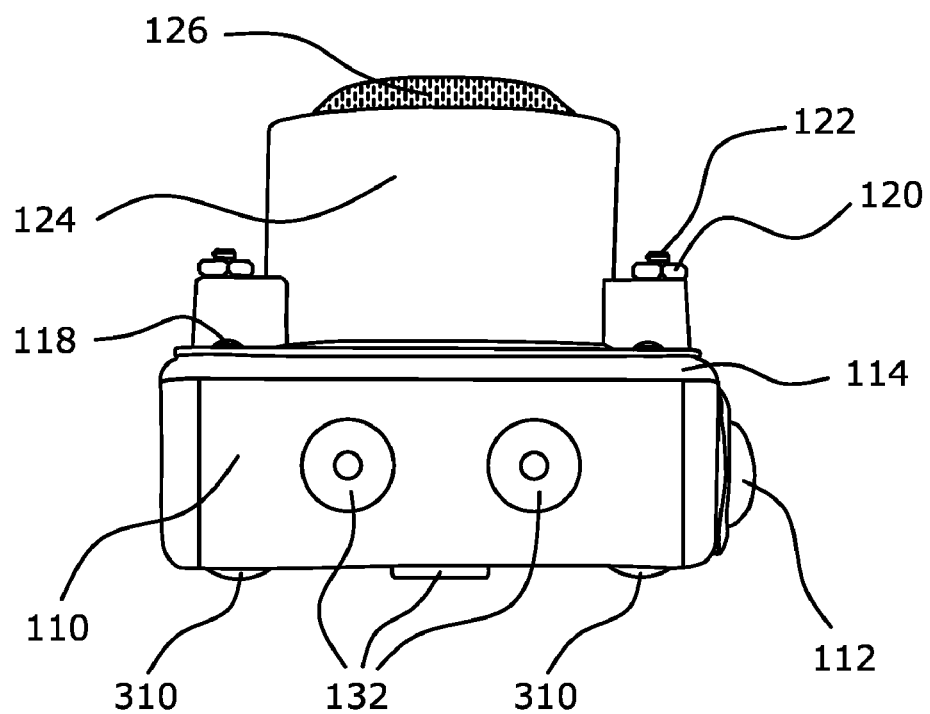
Figure 4:
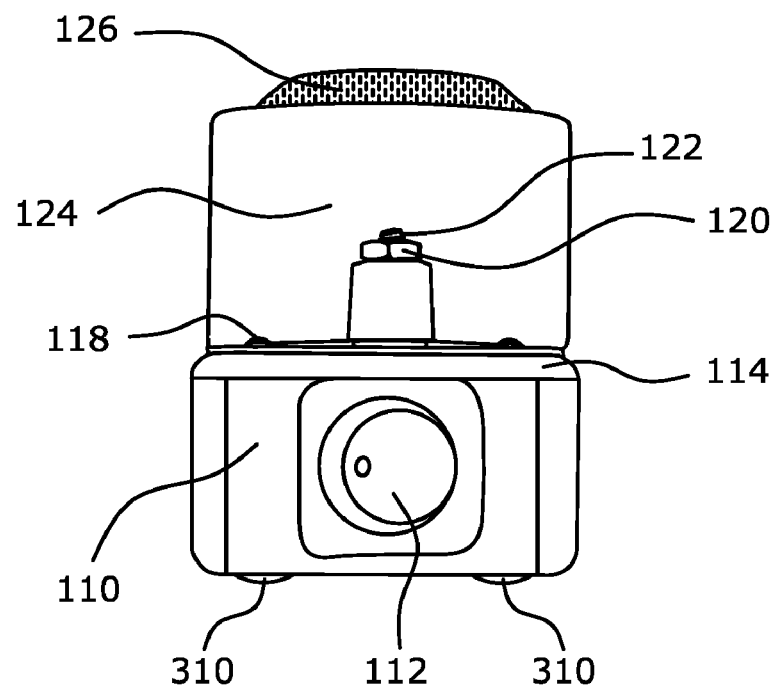
Figure 5:
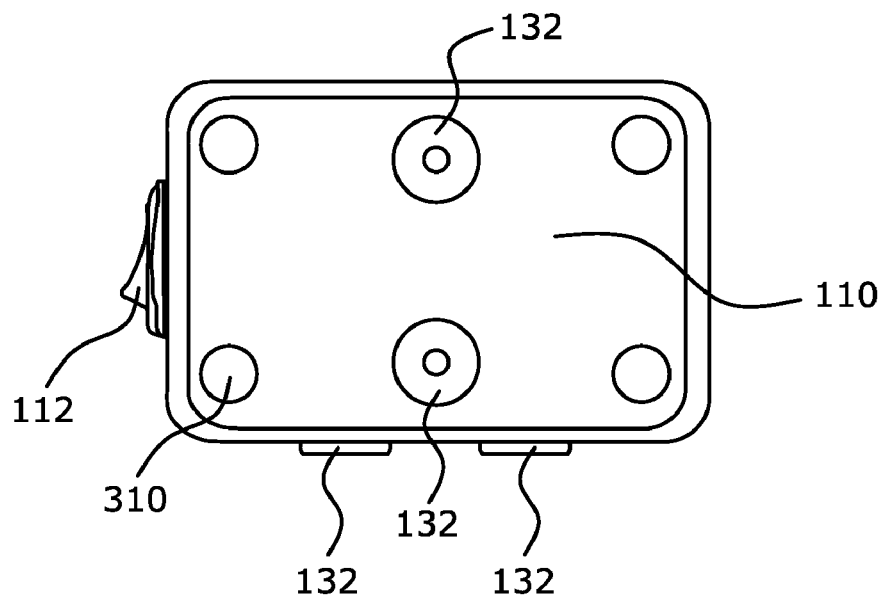
Figure 6:
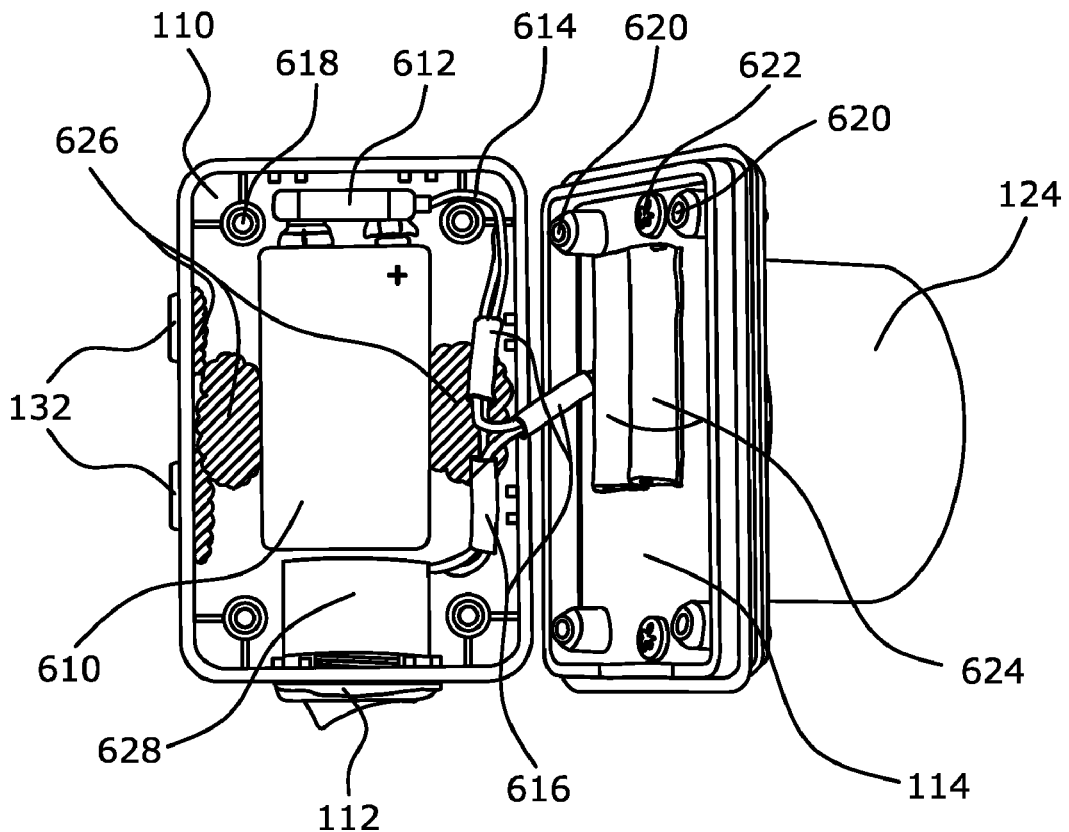
Figure 8:
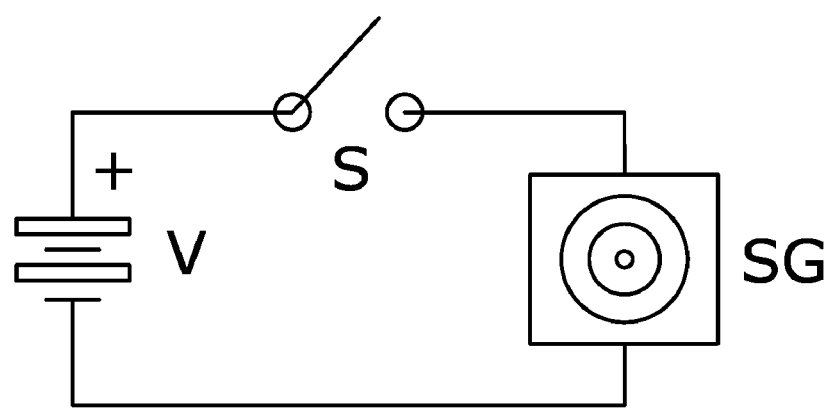
Figure 9:
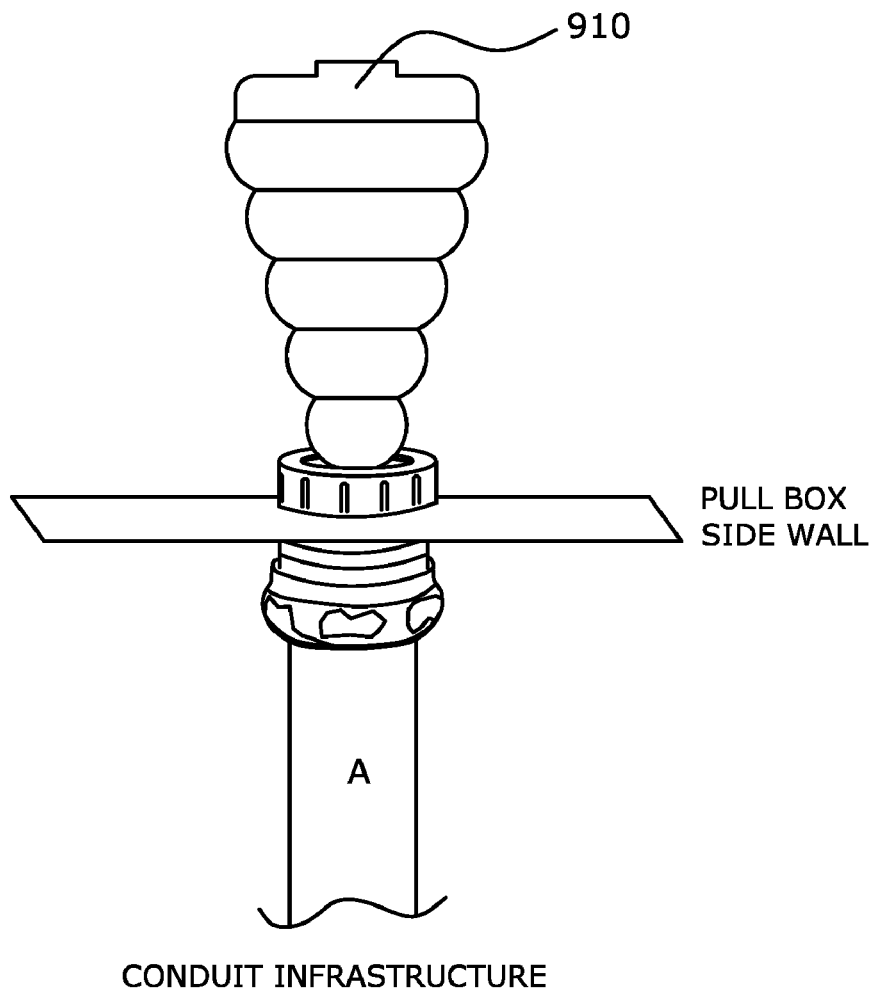

FIG. 1 shows a perspective view of the embodiment.
FIG. 2 shows a top view of the embodiment.
FIGS. 3 and 4 show side views of the embodiment.
FIG. 5 shows a bottom view of the embodiment.
FIG. 6 shows a perspective view of inside components of the embodiment.
FIGS. 7a and 7b demonstrate a sample usage of this application in the field.
FIG. 8 shows a sample electronic circuit diagram of a sound generator used inside the embodiment.
FIG. 9 shows an alternative embodiment of a sound generator along with a sample application scenario.

| DRAWINGS—REFERENCE NUMERALS | |
|---|---|
| 110 | enclosure |
| 112 | power button |
| 114 | lid |
| 116 | plate |
| 118 | screw |
| 120 | nut |
| 122 | bolt end |
| 124 | sound generator |
| 126 | aperture rotator |
| 128 | aperture |
| 130 | screen |
| 132 | rare-earth magnet |
| 310 | foot |

-continued

| DRAWINGS—REFERENCE NUMERALS | |
|---|---|
| 610 | battery |
| 612 | snap connector |
| 614 | wire |
| 616 | wire guide |
| 618 | screw holder |
| 620 | screw guide |
| 622 | bolt head |
| 624 | resilient support |
| 626 | epoxy |
| 628 | power button housing |
| 710 | sound detector |
| 910 | funnel |

DETAILED DESCRIPTION OF THE EMBODIMENT

FIG. 1 shows a perspective view of the conduit toner. Enclosure 110 holds all the components together. Power button 112 is positioned on the side wall of enclosure 110. Two rare-earth magnets 132 are fixed parallel on one side of the enclosure 110. A lid 114 is used to cover the enclosure 110. A plate 116 sits on the lid 114 and is fastened to the enclosure 110 from four corners on the top with screws 118. A sound generator 124 is placed on top of the plate 116 and fastened from two ends on a bolt end 122 and nut 120. Sound generator 124 has an aperture rotator 126 which is positioned on the top with a screw 118 for adjusting the sound output level or sound pressure mechanically. When the aperture rotator 126 is turned around the screw 118, which is slightly fastened on top of the sound generator 118, a screen 130 advances forward or backward to block or let the aperture 128 remain open. By doing this adjustment, less or more sound pressure or volume is generated.

FIG. 2 shows a top view of the embodiment. The rare-earth magnets 132 are horizontally positioned on the long side of the embodiment, so that the embodiment can be attached to any metallic surface inside an existing pull box for hands-free convenience during the test. When power button 112 is turned on, the sound generator 124 generates an audible tone. In this application, the sound generator includes a built-in speaker and a driver to create two harmonic tones in 100 dB. The frequency range and sound pressure level of the tone generator are in a detectable range.

FIGS. 3 and 4 show side views of the embodiment. The positioning of the rare-earth magnets 132 can be seen in FIG. 3. Feet 310 are used at the bottom of the enclosure 110 to provide horizontal balance and alignment when attached to a metallic surface, such as inside walls of an existing pull box.

FIG. 5 shows a bottom view of the embodiment. Two rare-earth magnets 132 are vertically aligned and fixed on the bottom of the enclosure 110. Horizontal alignment of the side rare-earth magnets 132 can also be seen in FIG. 5. This application has a total of four rare-earth Neodymium (Nd-FeB) magnets for improved pull force compared to standard magnets.

FIG. 6 shows a perspective view of inside components of the embodiment. Back side of the rare-earth magnets 132 are fixed inside the enclosure 110 with epoxy 626, so they can hold the embodiment securely on a flat metallic surface. However, there is no limit for the fastening material used. In lieu of epoxy, a multi-purpose glue, plastic fusion or mechanical compression can also be used. Power button 112 is inserted through a power button housing 628 to hold the power button 112 securely inside one side of the enclosure 110. A battery 610 is placed inside the enclosure 110 and stands horizontally at the bottom. A snap connector 612 is connected to the battery 610. Present application uses a 9V battery; however any electrical power source can be used to provide power to the sound generator 124. A wire 614 is passing through wire guides 616 while connecting the battery 610, power button 112 and the sound generator 124 together. A pair of resilient supports 624 is positioned on the back side of the lid 114 to provide a firm grip with the battery 610 when the lid 114 is closed on the enclosure 110 and fastened with screw holders 618 and screw guides 620 from four corners. The purpose of using the resilient support 624 is to ensure that the battery 610 is firmly secured inside the enclosure 110 and not able to shake during operation. In present application, a pair of rubber seals used as a resilient support 624; however other materials such as flexible materials made of plastic, foam, spring, etc. can also be used. Bolt head 622 is fastened to hold the sound generator 124 securely above the lid 114.

In FIG. 7a, the conduit toner is attached to the top wall of Pull Box #1 by using the rare-earth magnets on the bottom of the enclosure 110. The sound generator 110 is pointing directly toward conduit A. For instance, Pull Box #1 is located in the basement of a two-story building, while Pull Box #2 is located on the second floor. One technician stays in the basement and operates the conduit toner. Another technician holds a sound detector 710 which indicates an incoming sound from one of the conduit openings inside Pull Box #2. In this example, conduit B does not show any indication of incoming sound waves.

Similarly, in FIG. 7b the conduit toner is attached to the back wall of Pull Box #1 by using rare-earth magnets on one side of the enclosure 110. Once again, the sound generator 110 is pointed directly toward conduit A opening. In this example, conduit A shows an indication of sound waves on the dB scale of the sound detector 710. Therefore, it is confirmed that the correct conduit direction is from conduit A-to-conduit A, and from Pull Box #1 to Pull Box #2. If a cable run is installed in this direction, it will be connected from the basement to the second floor without any interruption.

FIG. 8 shows a sample electronic circuit diagram of a sound generator used inside the embodiment. "V" represents a power source, which is the battery 610 as shown in FIG. 6. "S" represents the power button 112 which is also shown in FIG. 6. "SG" represents a sound generator, which is the sound generator 124 in FIG. 6. The electrical circuit is connected in a series loop. That means when power button "S" is turned on, the sound generator "SG" starts generating sound waves in a detectable range. the scope of this application does not focus on the details how the sound is generated. The importance is that there is a controllable and detectable sound wave at the output of the sound generator 124.

FIG. 9 shows an alternative embodiment of a sound generator along with a sample application. As it is clearly seen, the shape of the embodiment is similar to a funnel 910, which is gradually increasing in diameter. The advantage of this embodiment is that it can be directly plugged into a conduit opening. If the conduit has a different diameter, then the funnel 910 compensates the change and adapts to a range of different conduit sizes accordingly without the risk of slipping inside the conduit opening.

As a third option, the alternative embodiment design showed in FIG. 9 can also be used as a combination with previously described embodiment in FIG. 1. Therefore, a gradually increasing funnel shape can be used as an adaptive plug or tip for the sound generator 124 as shown in FIG. 1. Similarly, the sound generator 124 in FIG. 1 can also be of a similar design like the one showed in FIG. 9.

From the detailed description above, a number of advantages of the embodiment of the conduit toner and detector become evident:
(a) ease of use
(b) portability
(c) accuracy
(d) labor saving
(e) safety
(f) compatibility
(g) ergonomy
(h) compact design Accordingly, the user will notice that the conduit toner and detector is more economical to manufacture and labor friendly to use when it is compared to other method and techniques. Thus, the scope of the present invention should be determined by the appended claims and their legal equivalents, rather than by the examples given.

What is claimed is:

1. An apparatus for identifying an unknown route of a conduit in combination with a pull box or junction box, wherein said conduit comprises a plurality of inner-wall diameters and two end openings, comprising:
   an enclosure comprising a bottom panel, a top panel and four side panels;
   a sound generator located on an outside surface of said top panel of said enclosure, wherein said sound generator generates a dual-tone sound wave in a detectable sound range;
   said sound generator is coupled to one of said conduit openings but not in direct contact with said conduit;
   a detector located at one end of said conduit to detect said dual-tone sound wave in said detectable sound range;
   said detector located at one end of said conduit comprises an indicator to prove presence of said dual-tone wave in said detectable sound range;
   an aperture rotator located on top of said sound generator, wherein said aperture rotator to control the volume of said dual-tone sound wave;
   a power button located on an outside surface of one of said side panels to control an electrical power source to power said sound generator;
   a plurality of holding mechanisms located on an outside surface of one of said side panels and said bottom panel to provide substantial pull force to hold said enclosure firmly to the existing metallic pull box or junction box.

2. The apparatus according to claim 1, wherein said detectable sound range is within the spectrum of audible and ultrasonic frequencies.

3. The apparatus according to claim 1, wherein said sound generator, said enclosure, and said detector shapes are selected from the group consisting of rectangular, oval, circular, trapezoidal, triangular, and any combination thereof.

4. The apparatus according to claim 1, wherein said enclosure is constructed of materials from the group consisting of plastic, rubber, polymer, aluminum, steel and any combination thereof.

5. The apparatus according to claim 1, wherein said power button is selected from the group consisting of electronic, mechanical, and any combination thereof.

6. The apparatus according to claim 1, wherein said enclosure and said detector are mobile and handheld units.

7. The apparatus according to claim 1, wherein said sound generator is universally compatible with a plurality of different types of conduits with or without existing cables in place.

8. The apparatus according to claim 1, wherein said plurality of holding mechanisms shape is selected from the group consisting of rectangular, oval, circular, donut, trapezoidal, triangular, and any combination thereof.

9. The apparatus according to claim 1, wherein said plurality of holding mechanisms is constructed of materials from the group consisting of magnets, rare earth magnets, electromagnets, adhesive materials, mechanical hooks, and any combination thereof.

10. The apparatus according to claim 1, wherein said detectable sound range is selected from the group consisting of visual, audio, vibration, light, graphical, and any combination thereof.

11. The apparatus according to claim 1, wherein said detector contains band pass filters, low and high band filters, air pressure sensors, microphones, amplifiers, comparators, oscillators, digital processors, digital memories, analog to digital, digital to analog converters, drivers, and any combination thereof.

12. A method of identifying an unknown route of a conduit in combination with a pull box or junction box from one end to another using a sound generator and a sound detector, comprising:
   (a) provide a sound generator at one end of a conduit,
   (b) position said sound generator toward said conduit opening anywhere inside the pull box or junction box without a direct contact with said conduit,
   (c) detect the incoming sound pressure level at the opposite end of said conduit opening with said sound detector,
   (d) identify the direction of said unknown conduit route by guided acoustical sound waves instantly and rapidly.

* * * * *